United States Patent [19]

Earrusso

[11] Patent Number: 5,637,233

[45] Date of Patent: Jun. 10, 1997

[54] METHOD AND APPARATUS FOR SEPARATING GREASE FROM WATER

[76] Inventor: Pat J. Earrusso, 3715A N. Cocoa Blvd., Cocoa, Fla. 32926

[21] Appl. No.: 480,177

[22] Filed: Jun. 7, 1995

Related U.S. Application Data

[63] Continuation-in-part of Ser. No. 168,095, Dec. 15, 1993, abandoned, which is a continuation of Ser. No. 897,904, Jun. 12, 1992, abandoned.

[51] Int. Cl.⁶ .................................................. B01D 21/24
[52] U.S. Cl. ................................. 210/767; 210/241
[58] Field of Search ............................ 210/241, 767, 210/242.3, 258, 521

[56] References Cited

U.S. PATENT DOCUMENTS

| | | |
|---|---|---|
| 4,816,167 | 3/1989 | Vanderslice .................. 210/776 |
| 4,818,399 | 4/1989 | Midkiff . | |
| 5,098,580 | 3/1992 | Anderson ................. 210/241 X |

FOREIGN PATENT DOCUMENTS

| | | | |
|---|---|---|---|
| 2028968 | 6/1970 | Germany ................. 210/241 |

*Primary Examiner*—Frank Spear
*Attorney, Agent, or Firm*—Warren L. Franz

[57] ABSTRACT

A volume of slurry including grease, water and sediment is pumped from a grease trap into a first interior compartment of a mobile tank truck, and the sediment allowed to settle. Some of the grease and water is then transferred from above the settled sediment to a second interior compartment through a tubular conduit, using a siphoning action. Water is then drained out through a discharge pipe from the bottom of the second compartment below the transferred grease and returned to the grease trap, retaining the transferred grease in the second compartment. The process is repeated for successive volumes of pumped slurry until the second compartment's capacity for retaining grease is reached. In one embodiment, the siphon conduit has a transparent U-bend tube running outside the truck for viewing the flow of transferred slurry. An intake end of the conduit extends into an open-topped sleeve and a conical deflector keeps sediment out of the sleeve. The discharge pipe is transparent for viewing flow from the drain. In another embodiment, the conduit has a "P"-shaped leg.

20 Claims, 4 Drawing Sheets

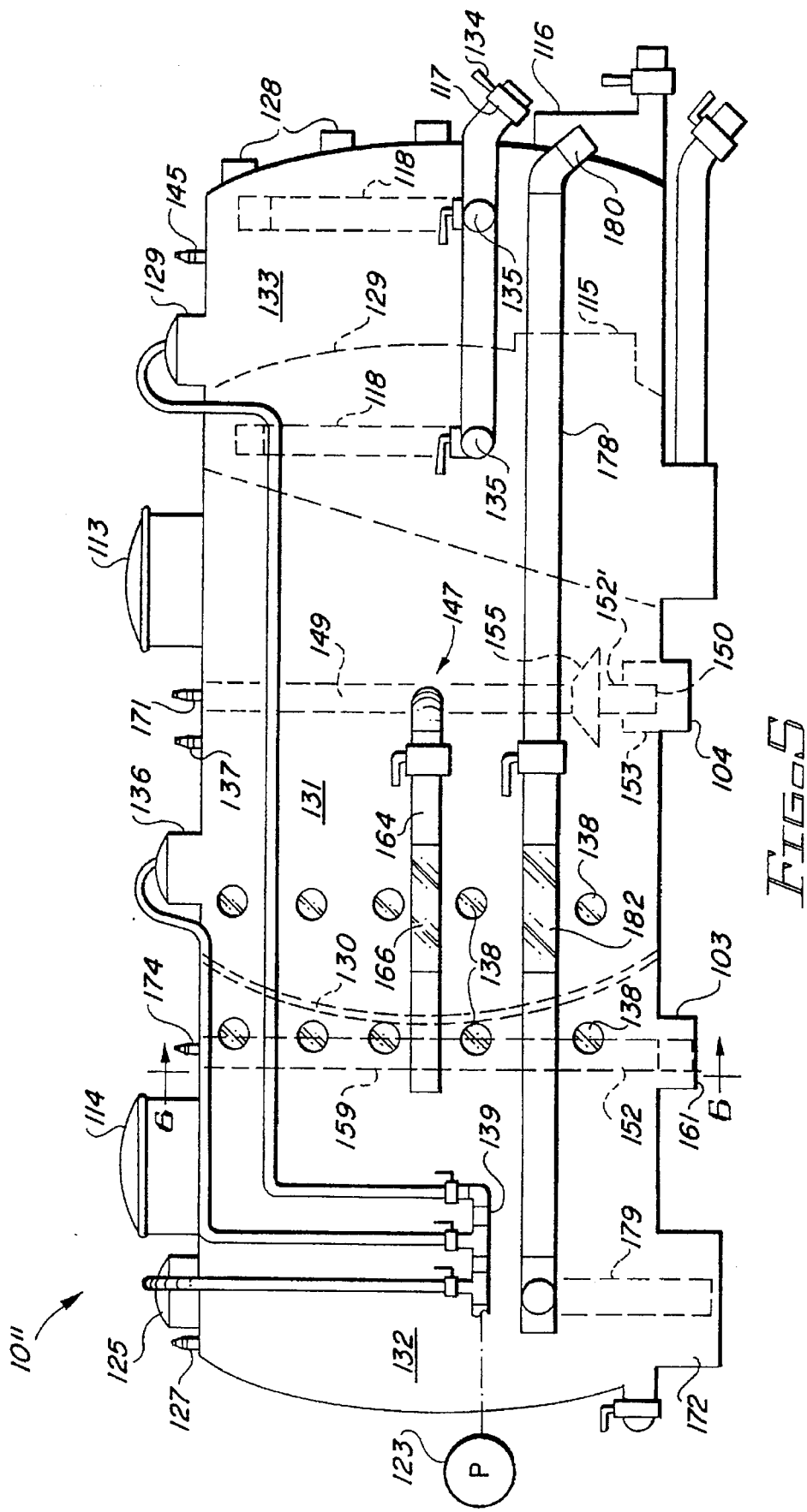

METHOD AND APPARATUS FOR SEPARATING GREASE FROM WATER

CROSS-REFERENCE TO RELATED APPLICATIONS

This is a continuation-in-part of Ser. No. 08/168,095, filed Dec. 15, 1993, abandoned; which is a continuation of Ser. No. 07/897,904, filed Jun. 12, 1992, abandoned.

TECHNICAL FIELD OF THE INVENTION

This invention relates, in general, to a method and apparatus for separating immiscible materials, such as grease and other water insoluble materials from water; and, in particular, to a mobile-based tank system for separating grease and sediment out of an aqueous slurry taken from a grease trap of a water disposal system.

BACKGROUND OF THE INVENTION

A typical conventional mobile tank truck used for cleaning a grease trap, such as a restaurant underground grease trap for the entrapment of cooking oil, grease and the like, of a water disposal system is shown in FIG. 1. Such a system comprises a closed elongated, cylindrical tank vessel 10 mounted horizontally on a wheeled base bed 11 of a truck 12. The tank 10 defines a single interior chamber or compartment which is accessible for cleaning through top and rear opening access hatches 14, 16. An intake port 17, connected to a diagonally rising intake pipe 18 (see FIG. 2), serves as a connection for a hose 19 to draw an aqueous slurry of grease and water from the grease trap into the interior of tank 10. A deflector 20 is located at the exit of pipe 18. A discharge port 21, located in the cover of the rear hatch 16, serves to drain the same slurry from the tank 10 after removal to a remote disposal site. A rotary vane vacuum pump 23, connected through a moisture trap or scrubber 24 and a shutoff assembly 25 to the interior of tank 10, serves to reduce or increase pressure in the tank 10 for control of drawing or expelling the slurry into or out of the tank 10. A pressure relief valve 27 acts to guard against the hazardous buildup of unacceptable pressure within the tank 10, and one or more sight eyes 28 enable the visual monitoring of the tank filling or discharging process.

In the existing grease trap cleaning procedures which utilize a mobile tank truck of the type illustrated in FIG. 1, the entire aqueous slurry is removed from the trap and transported to an approved disposal site. This is wasteful for several reasons. The entire volume of slurry in the grease trap is removed and takes up the same volume in the tank, regardless of the grease to water ratio in the trap. This means that the tank will be filled by the same amount, and the same amount must be transported and handled for disposal, regardless of whether the trap is filled with 90% grease and 10% water, or 10% grease and 90% water. For a 4,000-gallon tank vessel 10 emptying 1,200- to 3,000-gallon grease traps, therefore, the tank is brought to capacity and a trip to the disposal site is required after as few as one to three grease trap emptying stops. It is, thus, considered desirable to be able to separate the grease from the water at time of loading, so that the number of grease traps that can be cleaned before reaching full tank capacity is a function of the volume of grease, not the total volume of grease and water, in the loaded slurries.

SUMMARY OF THE INVENTION

It is an object of the present invention to provide a mobile-based tank system, suitable for the cleaning of underground grease traps, including provision for the local internal separation of grease from water.

In accordance with the invention, a method and apparatus for the cleaning of a grease trap, or the like, utilizes a truck-mounted vessel having a plurality of tank compartments, means for transferring received slurry from one compartment to another, and means for discharging the water component from the transferred slurry.

In one aspect of the invention, a conventional tank vessel, such as shown in FIG. 1, is partitioned and provided with a mechanism for siphoning slurry from a primary to a secondary compartment, and sump means in the secondary compartment for draining water out of the tank for reintroduction back into the grease trap. The transfer of slurry from the primary to secondary compartments can be repeated for multiple grease trap loads, until the total accumulated volume of grease from all of the traps reaches the capacity of the secondary tank. In this manner, the number of grease traps that can be cleaned for each trip to the disposal site is dependent only on the volume of grease, not on the volume of water, and grease disposal costs and procedures are based on disposal of grease, not disposal of grease and water.

BRIEF DESCRIPTION OF THE DRAWINGS

Embodiments of the invention have been chosen for purposes of illustration and description, and are shown in the accompanying drawings, wherein:

FIG. 5 is a view, similar to that of FIGS. 2 and 4, of a second embodiment of a tank truck in accordance with the invention.

Throughout the drawings, like elements are referred to by like numerals.

DESCRIPTION OF THE PREFERRED EMBODIMENTS

Figure 1:
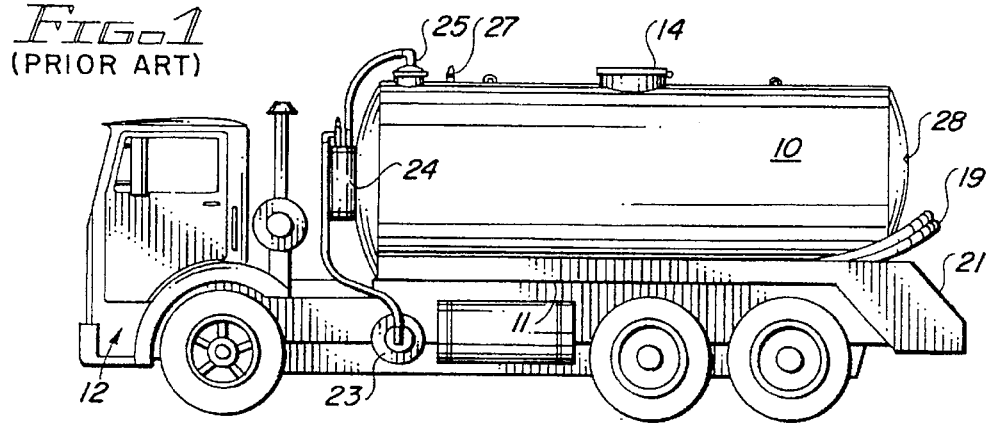
FIG. 1 (prior art) is a view of a conventional mobile tank truck used in the practice of known methods for cleaning grease traps.
Figure 2:
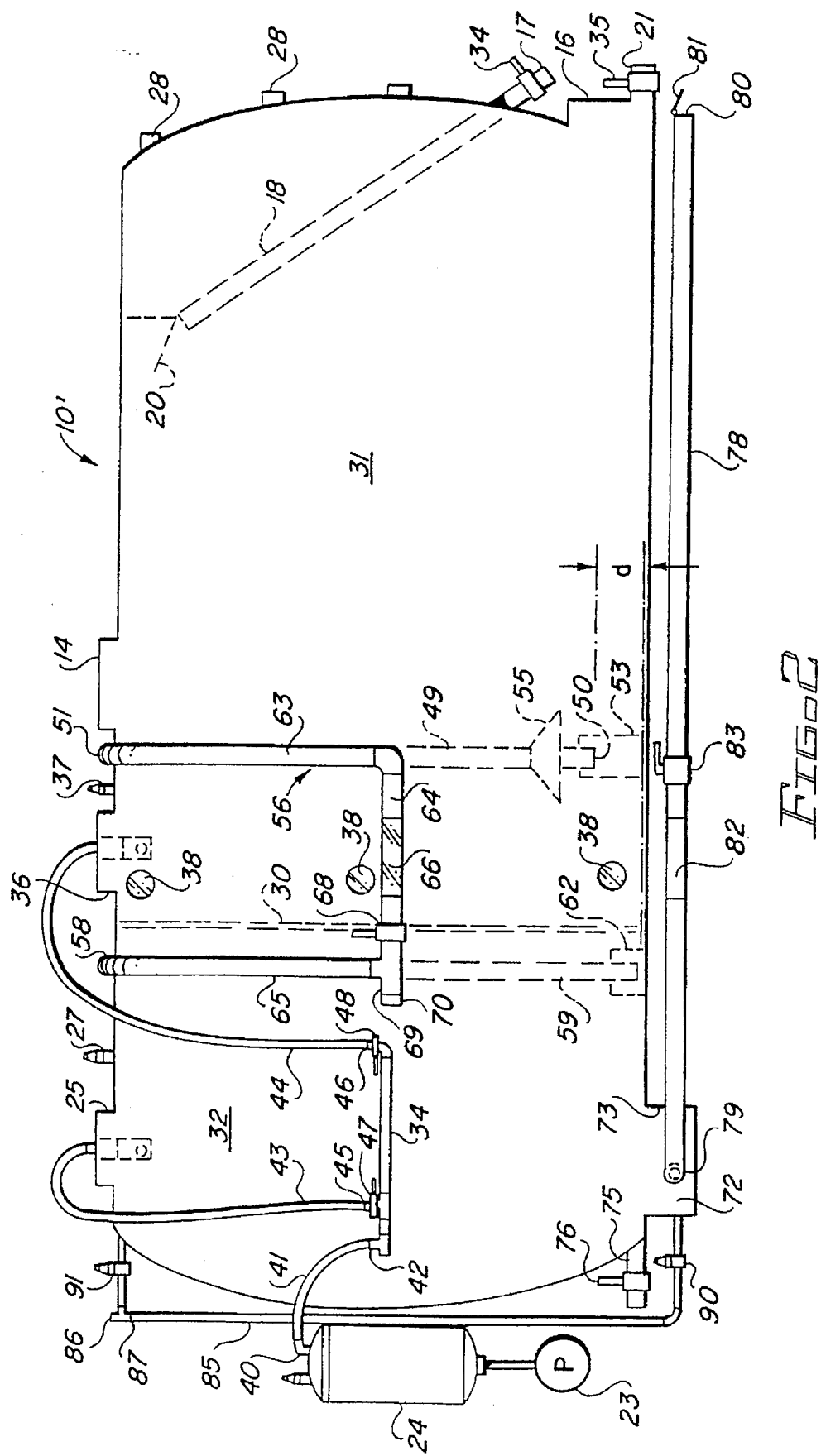
FIG. 2 is a schematic view of a tank truck as in FIG. 1, modified in accordance with the principles of the apparatus of the invention for use in the practice of the method of the invention.

An illustrative embodiment of the apparatus of the invention, suitable for practicing the method of the invention, is shown in FIG. 2, and comprises a modified tank vessel 10' which can be mounted on a wheeled truck 12 the same as tank 10 shown in FIG. 1.

The tank 10' has an interior chamber divided by means of a partition 30 into primary and secondary tank compartments 31, 32. For a 4,000 gallon steel vessel 10', for example, a vertical partition 30 can be placed to form primary and secondary compartments 31, 32 having capacities of 3,000 and 1,000 gallons, respectively. The partition 30 is located so that the existing top and rear hatches 14, 16, intake port 17, and intake pipe 18, all open into primary tank compartment 31, and so that the original shutoff assembly 25 and pressure relief valve 27 communicate with the newly formed secondary tank compartment 32. The original discharge port 21 remains in its former location at the rear access hatch 16, and shutoff valves 34, 35 remain for opening and closing the ports 17, 21.

In accordance with the principles of the invention, additional structure is added. A second shutoff assembly 36 is added to the top of unit 10' to communicate with the primary tank compartment 31 in the same way that the original assembly 25 now communicates with the secondary tank compartment 32. A second pressure relief valve 37 is added to serve the same function with respect to compartment 31, as relief valve 27 serves with respect to compartment 32. So that the compartment 32 is not made inaccessible due to the addition of partition 30, another access hatch is provided, as discussed further below, to permit entry to the second compartment 32 for cleaning purposes. Besides the sight eyes 28, additional sets of sight eyes 38 are provided in vertically spaced positions at one or more additional locations along the horizontal length of the tank 10', for viewing into one and/or the other of the compartments 31, 32. Pressure gauges (not shown) are also advantageously added to show the prevailing pressure in each compartment 31, 32.

For purposes of selectively drawing a vacuum in, or pressurizing, each of the chambers 31, 32, a valving manifold 39 is provided between the suction/pressurizing port 40 of moisture trap 24 and corresponding ports of shutoff assemblies 25, 36. Hose 41 connects port 40 to common input port 42 of the manifold 39, and hoses 43, 44 respectively connect the assemblies 25, 36 to the corresponding output ports 45, 46 of manifold 39. Manifold 39 includes valves 47, 48 for controlling which of hoses 43, 44 is placed in communication with hose 41 and, thus, with the pump 23 (FIG. 1).

A pickup tube 49 is disposed vertically within the compartment 31. Tube 49 has an open lower end 50 located a slight distance above the base of compartment 31, and an upper end 51 that passes through the wall of vessel 10' at the top of compartment 31. A siphon retainer, in the form of an open-topped cylindrical sleeve 53, is located coaxially over the lower end 50 of the tube 49 with the base of the retainer flush with the floor of compartment 32. The top of sleeve 53 extends a small distance above the elevation of the lower end opening 50 of tube 49 for the purpose of capturing a quantity of slurry to prevent loss of siphoning action, discussed below. A downwardly and outwardly converging conical deflector 55 coaxially surrounds tube 49 above the open top of sleeve 53 to deflect sediment away from the interior of the sleeve 53. The top of tube 49 connects by means of a downwardly extending, U-bend tube arrangement 56 to the top end 58 of a discharge tube 59 that depends vertically through the interior of compartment 32 toward an open lower end 61 located a distance "d" below the lower end 50 of pickup tube 49. As with end 50 of tube 49, end 61 of tube 59 is contained within the hollow of an open-topped, siphon retaining sleeve 62. Sleeve 62 is positioned and performs the same function with respect to tube 59, as sleeve 53 performs with respect to tube 49.

The U-bend connection 56 comprises a first vertical arm 63, a horizontal arm 64 and a second vertical arm 65. The vertical arms 63, 65 are dimensioned, configured and adapted to place the horizontal arm 64 approximately at eye level, so that the contents of arm 64 can be viewed through a clear, primary sight tube 66 established as part of arm 64. A valve 68 is positioned downstream of sight tube 66, to selectively turn on or shut off flow from tube 49 to tube 59, through the U-bend 56. A T-junction 69 includes a cap 70 that can be removed for purposes of cleaning the transparent section 66 of the horizontal arm 64.

A water sump 72 is added to the base of vessel 10', proximate the front of compartment 32. The sump 72 may be in the form of an access hatch similar to the conventional hatch 14; however, placed to project downwardly, rather than upwardly. Providing sump 72 in this fashion eliminates the necessity for providing an access hatch separately in partition 30 or elsewhere for entry into compartment 32. The sump 72 defines a cylindrical hollow 73 which is at the lowest level of compartment 32. A front discharge pipe 75, which has a shutoff valve 76 and exists in the original vessel 10, now serves the purpose of a drain for the compartment 32.

A new drain for compartment 32 is provided by a return line pipe 78 which extends horizontally below the bottom of vessel 10', from an intake port 79 opening into the sump 72, to a discharge port 80 located at the rear of vessel 10'. A one-way flapper valve 81, which opens to permit fluid to be discharged from sump 72 through pipe 78, acts to keep unwanted material out of pipe 78. A secondary sight tube 82 is accommodated along the length of pipe 78, preferably at a position below the primary sight tube 66. A shutoff valve 83 located downstream of sight tube 82, enables the selective cutoff of the flow of fluid from sump 72 through pipe 78 toward discharge port 80.

For determining the combined and separate levels of the components of liquid contained in compartment 32, a grease compatible sight tube 85 is connected externally of vessel 10', between the lowest and highest levels of chamber 32. A cap 86 at a T-connection 87 at the top of tube 85 provides means for accessing the interior of tube 85 for cleaning purposes. Horizontal tube lengths 88, 89 that connect the ends of tube 85, through the walls of vessel 10' to the chamber 32, include shutoff valves 90, 91 for controlling the flow of fluid in the tube 85.

Figure 3A:
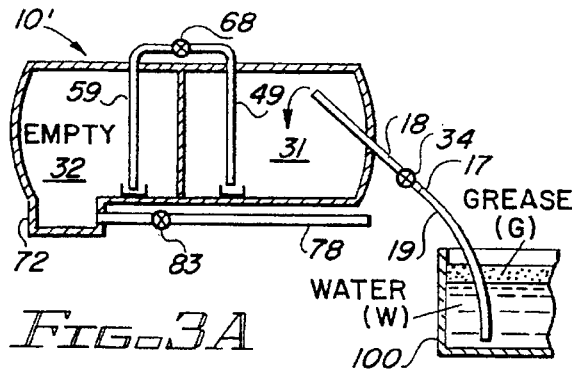
FIGS. 3A–3F are views of successive steps in a method of the invention utilizing the modified tank truck of FIG. 2.
Figure 3B:
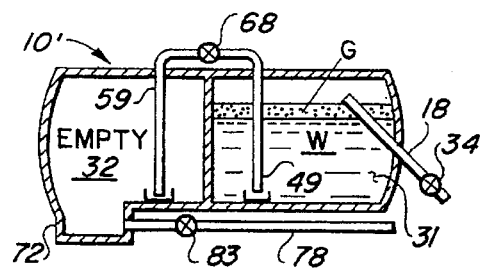

In operation, a hose 19 is attached in conventional manner to the intake port 17 of the intake pipe 18, and the pressure in the rear compartment 31 is lowered by connecting the shutoff assembly 36 through the manifold 39 and scrubber 24 to pump 23. The grease-water slurry is then pumped from the grease trap 100 into compartment 31, as indicated in FIG. 3A. Valve 34 is open; valves 35, 68, 76 and 83 are closed. At 3,000-gallon capacity, the primary compartment 31 is sized so that the entire contents of a 1,200- to 3,000-gallon grease trap can be pumped into the compartment 31 at one time. This is not a requirement, however. Once the slurry is within the compartment 31, valve 34 is closed, low pressure created by pump 23 is released, and the captured slurry allowed to settle. Sediment will settle out and be accumulated in the base of compartment 31 at a level below the top of sleeve 53 for retrieval at a later time through discharge port 21. The deflector 55 prevents sediment from dropping into the top opening of the sleeve 53. The water and grease will find different levels based upon their differences in density. The described apparatus contemplates that the grease will have a specific gravity less than unity, so will stay on top of the water, as shown in FIG. 3B. (The system can, however, be readily modified to accommodate the situation where the undesirable fluid is denser than the desirable fluid.)

Figure 3C:
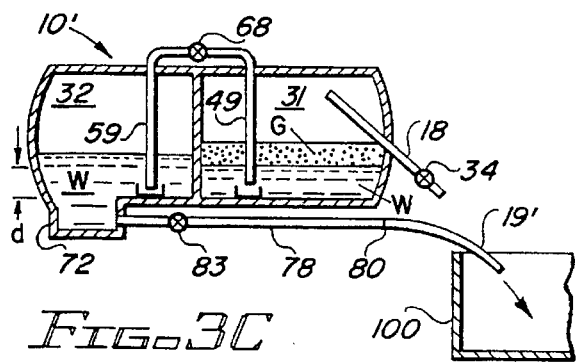

At this point, valve 68 is opened to allow the aqueous slurry of water and grease to be transferred through the tube 49, U-bend 56 and tube 59 into the second compartment 32 by means of siphoning. To "prime" the siphoning action, the valves 47, 48 are manipulated in combination with the pump 23 to provide a pressure differential between the compartments 31, 32 that initiates a flow in the forward direction from compartment 31 to compartment 32, i.e., the pressure in compartment 31 is made higher relative to that in compartment 32. This can be done either by initially applying a greater than atmospheric pressure to compartment 32, or by momentarily drawing a lower than atmospheric pressure at compartment 32. Once the flow of material from compartment 31 to compartment 32 is initiated, the flow will continue under a siphoning action even if the pressure differential is removed (at least until the level of fluid in compartment 32 reaches the same height as the level of fluid in the compartment 31). This is shown in FIG. 3C.

Figure 3D:
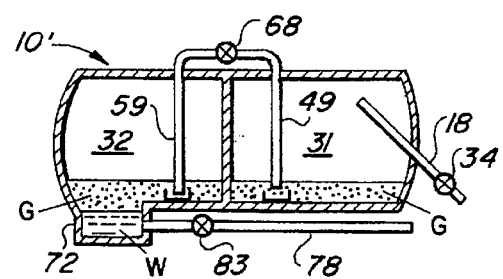

Because the water is at a lower level in compartment 31 than the grease, the water will be drawn off first. The progress of the transfer of fluid can be monitored at sight tube 66, as well as at sight eyes 38. As the water is received into compartment 32, it flows over the top of sleeve 62 and into the sump 72, from which it can be withdrawn by opening the valve 83. Valve 83 can be opened to let water flow through the return pipe 78 and hose 19' connected at discharge port 80, back to the grease trap 100, where it can be disposed of in the same manner as other runoff water entering grease trap 100. The grease trap 100 will, however, be free of grease at this point. (If preferred, the water can be run to a different container or compartment, rather than back to the trap 100.) The flow of water through pipe 78 can be continued until inspection at sight tubes 66 and 85 shows that the water level has been depleted from compartment 31 and grease from the grease level is beginning to be transferred to compartment 32. At this point, valve 83 is closed (see FIG. 3D) and grease will continue to flow into compartment 32 by siphoning action until the level of grease brought into compartment 32 reaches the same height as the level of grease left in compartment 31.

Unlike conventional methods for cleaning grease traps using a single compartment vessel 10 like that shown in FIG. 1, the described method using the apparatus of FIG. 2 can clean an aggregate volume of grease traps greater than the capacity of vessel 10' before requiring a trip to the grease disposal site. The number of grease traps cleaned per trip will depend on the volume of grease in the processed slurries, not on the total volume of the slurries.

Figure 3E:
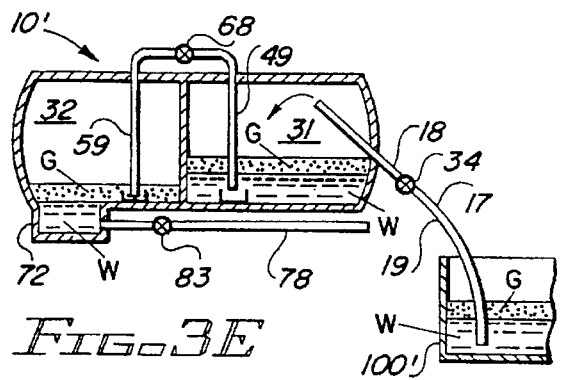
Figure 3F:
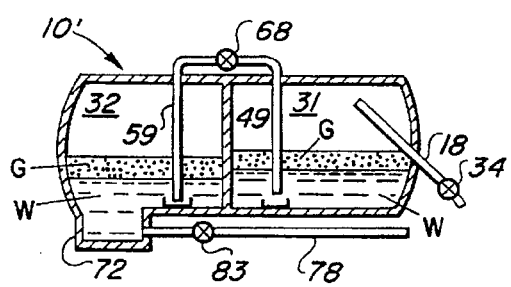

Once the siphoning action from the first load of processed slurry is stopped, the grease level in compartment 31 can be left as is, or can be discharged into compartment 32 by pumping up the pressure in compartment 31, or by drawing down the pressure in compartment 32. Valve 68 can then be closed and valve 34 reopened to take another load of slurry (this time, e.g., from a different grease trap 100') into the compartment 31 in the same manner as for the intake of the first load, discussed above in reference to FIG. 3A. The pressure in compartment 31 is lowered, and the new load of slurry flows in as shown in FIG. 3E. The water can then be drawn off into compartment 32 as before, as shown in FIG. 3F; however, this time initially keeping valve 83 closed until the separation of levels of grease and water reaches a steady state in compartment 32. Valve 83 can then be opened to drain the water out of compartment 32 and return it back to the grease trap, or otherwise locally dispose of it. The procedure can then be repeated, again and again, for successive grease traps until the volume of grease reaches the capacity of compartment 32. At that point, the vessel 10' is transported to the grease disposal site and the grease drained out through return line pipe 78 or discharge pipe 75. The siphoning action can be used whenever the total liquid level in tank 31 is greater than the total liquid level in tank 32. When the level of residual grease in compartment 32 between grease traps begins to rise, the action of pump 23 can be used to augment the siphoning action as necessary.

The siphoning action depends on the difference "d" in heights of the legs 49, 59 of the siphon. Pumping is necessary only to "prime" the siphon. When both legs 49, 59 of the siphon are full, movement of liquid up the shorter leg 49, over the bend 56, and down the longer leg 59 is responsive to intermolecular forces between the liquid molecules and gravitational force. Once the inverted "J" of the siphon is filled with liquid, the hydrostatic force due to gravity ("hydrostatic head") on the outlet side 59 will be greater than that on the inlet side 49. Thus, once the siphon is filled, the transfer of liquid between compartments 31 and 32 will be maintained without action of pump 23, until either the liquid levels in both compartments are equal, or air is sucked into the siphon at inlet side opening 50.

Sleeve 53 serves to delay premature cessation of siphoning action due to entry of air at inlet opening 50 by isolating opening 50 from transient fluctuations in the level of liquid in compartment 31. Sleeve 62 serves the same purpose at outlet opening 61 with respect to liquid level transients in compartment 32. Sleeves 53, 62 also aid in retaining liquid within tubes 49, 59 to minimize the necessity for repriming between siphonings. This makes it possible to conduct siphoning, or maintain the siphon filled, while traveling to the next site.

The employment of siphoning action, rather than pumping, during separation and transfer of liquid not only conserves energy and prolongs pump life, but is much quieter. When grease traps are cleaned, the noise from pumping can be disturbing, especially during peak operating times or near residential areas at night.

Figure 4:
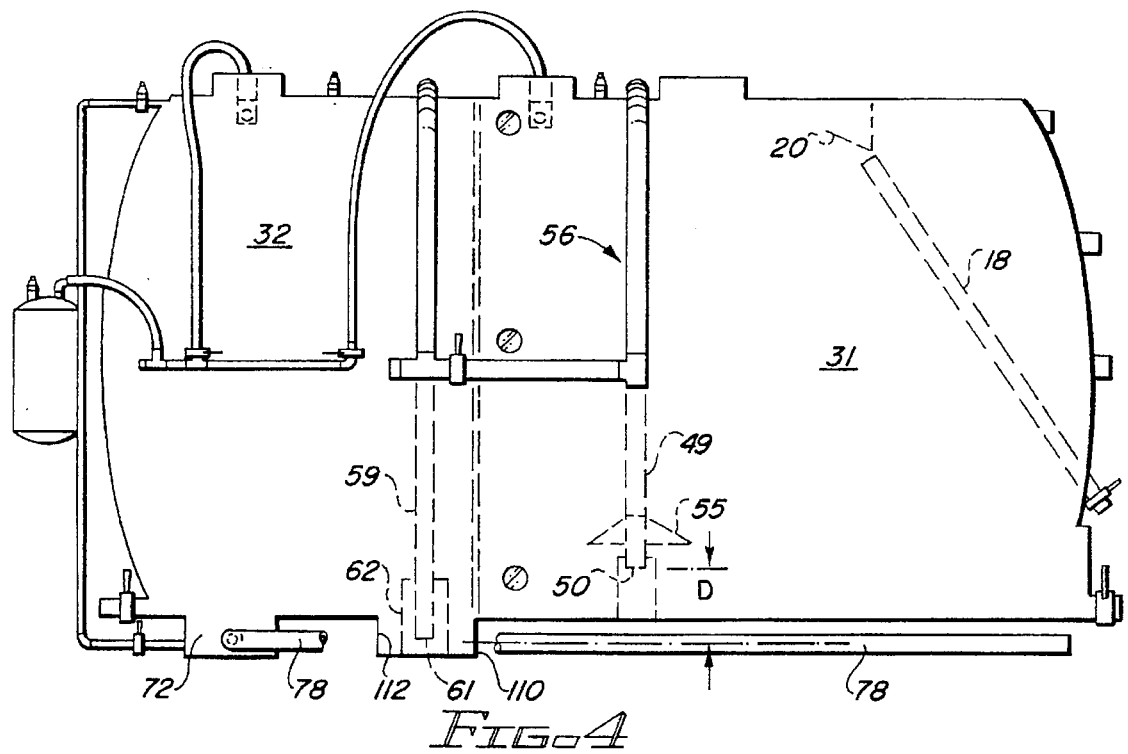
FIG. 4 is a view, similar to that of FIG. 2, of a variation of the modified tank truck of FIG. 2.

The siphoning action can be enhanced by increasing the differential "d" between the elevations of pickup and discharge tube openings 50, 61, to a greater differential "D". One way to do this, without increasing the distance of opening 50 above the base of compartment 31, is by lowering the elevation of outlet 62 below the base of compartment 32. This is illustrated in FIG. 4, wherein a second sump 110 is added at the base of vessel 10', proximate the partition 30. Lower end 61 of discharge tube 59 can then be extended below the base of compartment 32, down into the descent of sump 110, providing a greater differential "D" between the elevations of siphon inlet and outlet openings 50, 61. As with sump 72, sump 110 can take the form of a downwardly projecting access hatch to facilitate access and cleanout. If the sump is deep enough, its walls 112 can provide the siphon retaining function, thereby eliminating any need for sleeve 62. Also, if desired, the addition of a second sump 110 can be avoided by simply extending end 61 of tube 59 into the existing sump 72. The use of separate sumps 72, 110 will, however, make it easier to keep grease from entering the return line 78 during return of water to the grease trap.

Figure 6:
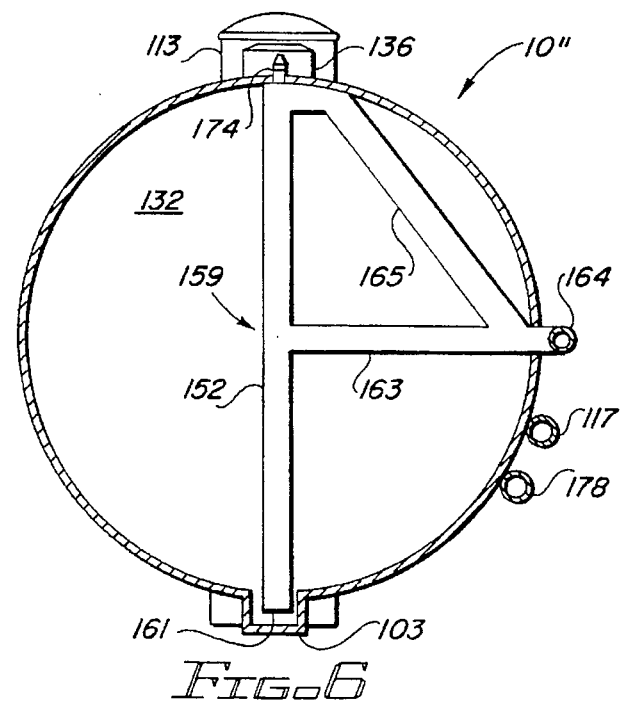
FIG. 6 is a section view, taken along the line 6—6 of FIG. 5.

FIGS. 5 and 6 illustrate another embodiment of tank truck 10" having an interior chamber divided by means of partitions 129 and 130 into three tank compartments 131, 132, 133. Compartments 131, 132 correspond to primary and secondary compartments 31, 32, discussed above. Compartment 133 is an auxiliary compartment, into which slurry can be pumped, and which may or may not be communicated to compartment 132. Hatches 113 and 114 provide access, respectively, into the interiors of compartments 131, 132. Access to compartment 133 is provided through rear hatch 116, corresponding to hatch 16, above. Partition 129 includes a similar hatch 115 providing internal access between compartments 131, 133. Compartments 131, 132, 133 are connected through respective shutoff assemblies 136, 125, 129 and valve manifold 139 to pump 123. Each compartment 131, 132, 133 also has a dedicated pressure relief valve 137, 127 145. View into the separate compartments 131, 132, 133 is provided by sets of eye sights 138, 128.

Delivery of slurry into the primary and auxiliary compartments 131, 133 is accomplished by means of identical intake pipes 118 which extend laterally, inward and upward into the respective compartments from an intake port manifold 117 that extends from a rear hose connection longitudinally externally of the tank 10". Valve 134 controls shutoff of the intake port. Valves 135 control which compartment 131, 133 receives the slurry. With valve 134 closed and both valves 135 open, liquid can be pumped between compartments 133 and 131.

A siphoning assembly 147, corresponding to the assembly 49, 59, 56 of FIGS. 2 and 4, extends between compartments 131 and 132. Each leg 149, 159 of the siphon 147 has a similar "P"-shaped configuration. As shown in FIG. 6, leg 159 comprises a vertical tube 152 with an open lower end 161 that extends below the base of compartment 132 into the cavity of a depending sump 103. A horizontal tube 163 extends laterally from a central connection to tube 152, out through the wall of vessel 10", to connect to a longitudinally rearward extending horizontal arm 164. A diagonal tube 165 connects the top of tube 152 to a point on tube 164, just inside the vessel wall. Leg 149 is similar, having a vertical tube 152' (FIG. 5) with an open lower end 150 that may, if desired, be extended below the base of compartment 131 into the cavity of a depending sump 104. The elevation of end 150 is higher than the elevation of end 161 to provide a hydrostatic head differential for siphoning purposes. A sleeve 153 is optionally positioned about the end 150, and a deflector 155 may be positioned above sleeve 153. The lateral run of tubing 164 of leg 149 passes through the vessel wall and joins the other end of horizontal arm 164. Arm 164 corresponds to the horizontal run of tubing 64 in FIG. 2, and includes a sight tube section 166 similar to sight tube 66.

The operation of vessel 10" is similar to that described for vessel 10'. Siphoning assembly 159 functions like the siphon assembly 49, 56, 59; however, the "P"-shaped legs offer certain advantages. If air enters leg 149 or 159, it will be directed to the top of vertical tube 159. The flow of fluid through lateral tube 163 will not, however, be interrupted. Moreover, the continued flow through lateral tube 163, past the connection with vertical run 165, will act in a "self-priming" way to help prevent cessation of flow around the top of the "P". An air discharge valve 171, 174 can, optionally, be added for removal of air from the legs 149, 159.

Drainage for compartment 132 is effected through a sump 172 that corresponds to sump 72 in FIGS. 2 and 4. A return line pipe 178 extends longitudinally along the outside of vessel 10", from a point of passage through the vessel wall of a diagonal run of tubing 179, to a discharge port 180 located at the rear of vessel 10". A sight tube 182 located within the run of pipe 178 provides view of the discharge.

Those skilled in the art to which the invention relates will appreciate that, though the embodiment shown in FIG. 2 has two compartments 31, 32 formed in the same vessel 10', the same principles can be applied to more than two compartments placed in similar operative communication or to two or more compartments formed in separate vessels. Skilled Artisans will also appreciate that other substitutions and modifications can be made to the described embodiment without departing from the spirit and scope of the invention as described by the claims below.

What is claimed is:

1. A method for cleaning a grease trap, comprising the steps of:

providing a mobile tank truck having first and second interior compartments;

pumping a volume of grease-water slurry from said grease trap into said first compartment;

priming a siphon connecting said first and second compartments;

transferring at least a part of said volume of slurry from said first to said second compartment, through said siphon, using a siphoning action;

draining water from said transferred part of said volume out of said second compartment; and returning said drained water back to said grease trap.

2. The method of claim 1, wherein said siphon is a conduit having an inlet connected to said first compartment and an outlet connected to said second compartment; said priming step comprises filling said tube with liquid to provide a greater hydrostatic head at said outlet than at said inlet; and said transferring step comprises transferring said at least part of said slurry volume from said first to said second compartment under motivation of said difference in hydrostatic heads.

3. The method of claim 1, wherein said siphon comprises a tubular conduit having an inlet side leg connected to said first compartment, an outlet side leg connected to said second compartment, and a bend connecting said inlet and outlet side legs; and said priming step comprises filling said conduit to provide a height of liquid in said outlet side leg which is greater than a height of liquid in said inlet side leg.

4. A method for cleaning grease traps, comprising the steps of:

providing a mobile tank truck having first and second interior compartments, each having a top and a bottom; an intake port for communicating said first compartment with the exterior of said tank truck; a pump connected for creating a pressure differential between said first compartment and said tank exterior or said second compartment; a conduit siphon connecting a point above said first compartment bottom to a point above said second compartment bottom, said second compartment point being below said first compartment point; and a drain for communicating said second compartment bottom with said tank truck exterior;

pumping a volume of grease-water slurry from a grease trap into said first compartment through said intake port using said pump;

transferring at least a part of said volume of slurry from above said first compartment point to said second compartment through said siphon conduit, using siphoning action; and draining water from said transferred part out from said bottom of said second compartment through said drain.

5. The method of claim 4, further comprising the step of returning said drained water to said grease trap.

6. The method of claim 4, wherein, in said transferring step, said transferred part includes grease and water; and, in said draining step, at least some of said transferred water is drained out from below said transferred grease, while said transferred grease is retained in said second compartment.

7. The method of claim 4, wherein, in said pumping step, said slurry includes grease, water and sediment; said method further includes letting said sediment in said pumped slurry settle to said first compartment bottom, below said first compartment point; in said transferring step, grease and water in said pumped slurry is transferred from above said settled sediment and first compartment point to said second compartment through said siphon conduit, so that said transferred grease floats above said transferred water in said second compartment; and water from said transferred water is drained out from below said transferred grease through said drain, while retaining said transferred grease in said second compartment.

8. The method of claim 7, further comprising the step of viewing the flow of material through said siphon conduit during said transferring step.

9. The method of claim 8, further comprising returning said drained water to said grease trap through a drain conduit having a valve; viewing said draining of water from said second compartment through said conduit; and controlling said valve in response to said viewing.

10. The method of claim 4, wherein said volume is a first volume and said method further comprises the steps of:

pumping a second volume of grease-water slurry, from the same or another grease trap, into said first compartment through said intake port using said pump;

transferring at least a part of said second volume of slurry from above said first compartment point to said second compartment through said siphon conduit, using siphoning action; and draining water from said transferred part of said second volume out from said bottom of said second compartment through said drain.

11. The method of claim 10, wherein, in said transferring steps, said transferred parts include grease and water; and, in said draining steps, at least some of said transferred water is drained out from below said transferred grease, while said transferred grease is retained in said second compartment.

12. The method of claim 11, wherein said second compartment has a capacity; and wherein the pumping, transferring and draining steps are repeated for successive further volumes of slurry, with the transferred grease from said successive volumes being accumulated along with said first and second volume transferred grease in said second compartment, until said second compartment capacity is reached.

13. The method of claim 4, further comprising the step of using said pump to prime said siphon conduit.

14. A mobile tank truck, suitable for cleaning grease traps, comprising:

a tank having an interior chamber divided into first and second compartments, each having a top and a bottom; said tank having intake and discharge ports for communicating said first compartment with the exterior of said tank;

a pump connected for creating a pressure differential between said first compartment and said tank exterior or said second compartment;

a siphon conduit connecting a point above said first compartment bottom to a point above said second compartment bottom, said first compartment point being above said second compartment point for flow of material by siphoning action from said first to said second compartment;

a drain for communicating said second compartment bottom with said tank exterior for draining material from said second compartment.

15. The truck of claim 14, wherein said siphon conduit comprises a tube having an open lower end directed downwardly at said first compartment point, and a cylindrical sleeve located coaxially over said lower end; said sleeve having an open top extending above said elevation of said lower end opening to said first compartment point.

16. The truck of claim 15, wherein said siphon conduit further comprises a downwardly and outwardly converging conical deflector coaxially surrounding said tube above said open top of said sleeve, for deflecting sediment away from said open top.

17. The truck of claim 14, wherein said siphon conduit includes a first tube having an open lower end directed downwardly within said first compartment; a second tube directed within said second compartment; and a U-bend tube arrangement connecting said first and second tubes exteriorly of said chamber; at least a part of said U-bend tube being transparent for viewing the flow of material through said siphon conduit comprising.

18. The truck of claim 14, wherein said drain comprises a sump defining a lowest level at said second compartment bottom, and a discharge pipe connected to said sump; at least a part of said discharge pipe being transparent for viewing the draining of material through said drain.

19. The truck of claim 14, further comprising means for viewing the flow of material through the siphon conduit; and means for viewing the draining of material through said drain.

20. The truck of claim 14, wherein said siphon conduit comprises a tubular conduit having an inlet side leg connected to said first compartment, an outlet side leg connected to said second compartment, and a bend connecting said outlet to said inlet legs; at least one of said inlet and outlet side legs having a "P"-shaped configuration including a vertical tube with an open lower end, another tube extending laterally from a central connection to said vertical tube, and a diagonal tube connecting a top of said vertical tube to a point on said laterally extending tube.

* * * * *